(12) United States Patent
Webster et al.

(10) Patent No.: US 10,563,519 B2
(45) Date of Patent: Feb. 18, 2020

(54) ENGINE COMPONENT WITH COOLING HOLE

(71) Applicant: GENERAL ELECTRIC COMPANY, Schenectady, NY (US)

(72) Inventors: Zachary Daniel Webster, Mason, OH (US); Gregory Terrence Garay, West Chester, PA (US); Kevin Robert Feldmann, Mason, OH (US); Steven Robert Brassfield, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 61 days.

(21) Appl. No.: 15/898,716

(22) Filed: Feb. 19, 2018

(65) Prior Publication Data
US 2019/0257205 A1  Aug. 22, 2019

(51) Int. Cl.
*F01D 5/18* (2006.01)
*F01D 9/04* (2006.01)
*F01D 25/12* (2006.01)

(52) U.S. Cl.
CPC .............. *F01D 5/186* (2013.01); *F01D 9/041* (2013.01); *F01D 25/12* (2013.01); *F05D 2220/32* (2013.01); *F05D 2240/12* (2013.01); *F05D 2240/24* (2013.01); *F05D 2260/202* (2013.01)

(58) Field of Classification Search
CPC .................................. F01D 5/186; F01D 5/187
See application file for complete search history.

(56) References Cited

U.S. PATENT DOCUMENTS

| 3,819,295 | A |   | 6/1974  | Hauser et al. |
|-----------|---|---|---------|---------------|
| 4,487,550 | A | * | 12/1984 | Horvath ............... F01D 5/20 416/92 |
| 4,540,339 | A | * | 9/1985  | Horvath ............... F01D 5/20 415/115 |
| 5,125,798 | A |   | 6/1992  | Muth et al. |
| 5,326,224 | A | * | 7/1994  | Lee .................... F01D 5/186 416/90 R |
| 5,407,150 | A |   | 4/1995  | Sadleir |
| 5,511,946 | A | * | 4/1996  | Lee .................... F01D 5/182 416/97 R |
| 5,688,107 | A | * | 11/1997 | Downs ................ F01D 5/18 415/173.1 |
| 6,257,831 | B1 |  | 7/2001  | Papple et al. |
| 6,280,140 | B1 |  | 8/2001  | Soechting et al. |
| 6,383,602 | B1 | * | 5/2002 | Fric .................... F01D 5/186 428/131 |
| 6,916,150 | B2 | * | 7/2005 | Liang ................ F01D 5/186 415/115 |

(Continued)

FOREIGN PATENT DOCUMENTS

EP            2942485 A1    11/2015

*Primary Examiner* — Woody A Lee, Jr.
(74) *Attorney, Agent, or Firm* — McGarry Bair PC

(57) ABSTRACT

An apparatus and method an engine component for a turbine engine comprising an outer wall bounding an interior and defining a pressure side and an opposing suction side, with both sides extending between a leading edge and a trailing edge to define a chord-wise direction, and extending between a root and a tip to define a span-wise direction, at least one cooling passage located within the interior, at least one cooling hole having an inlet fluidly coupled to the cooling passage and an outlet located along the outer wall.

23 Claims, 10 Drawing Sheets

(56) References Cited

U.S. PATENT DOCUMENTS

| | | | | |
|---|---|---|---|---|
| 6,988,872 B2* | 1/2006 | Soechting | ............... | F01D 5/186 415/115 |
| 7,056,093 B2* | 6/2006 | Self | ................. | F01D 5/186 415/115 |
| 7,118,337 B2 | 10/2006 | Liang | | |
| 7,273,351 B2* | 9/2007 | Kopmels | ................. | F01D 5/186 416/97 R |
| 7,300,250 B2 | 11/2007 | Papple | | |
| 7,438,528 B2* | 10/2008 | Goodman | ............... | F01D 5/187 416/97 R |
| 7,572,103 B2 | 8/2009 | Walters et al. | | |
| 8,011,889 B1 | 9/2011 | Liang | | |
| 8,522,558 B1* | 9/2013 | Xu | ......................... | F01D 5/186 415/115 |
| 9,234,438 B2* | 1/2016 | Lee | ......................... | F01D 25/12 |
| 9,249,670 B2* | 2/2016 | Bunker | ................... | F01D 5/186 |
| 9,482,101 B2 | 11/2016 | Xu | | |
| 9,810,072 B2 | 11/2017 | Dong et al. | | |
| 9,897,006 B2* | 2/2018 | Miranda | ................... | F02C 7/18 |
| 9,932,836 B2* | 4/2018 | Schnieder | ............... | F01D 5/186 |
| 10,196,902 B2* | 2/2019 | Moore | ................... | F01D 5/186 |
| 2001/0016162 A1* | 8/2001 | Lutum | ................... | F01D 5/186 416/97 R |
| 2001/0036401 A1* | 11/2001 | Harvey | ................... | F01D 5/145 415/115 |
| 2002/0018717 A1* | 2/2002 | Dailey | ................... | F01D 5/182 416/97 R |
| 2004/0151586 A1 | 8/2004 | Chlus et al. | | |
| 2005/0025167 A1 | 2/2005 | Ishibashi et al. | | |
| 2007/0007160 A1 | 1/2007 | Tattam | | |
| 2009/0013695 A1* | 1/2009 | Dierberger | ............... | F23R 3/007 60/754 |
| 2009/0274549 A1* | 11/2009 | Mitchell | ................. | F01D 5/182 415/115 |
| 2012/0167389 A1* | 7/2012 | Lacy | ...................... | B23P 6/002 29/889.1 |
| 2013/0004332 A1* | 1/2013 | Schnieder | ............... | F01D 5/186 416/97 R |
| 2016/0069189 A1 | 3/2016 | Quach et al. | | |
| 2016/0169002 A1* | 6/2016 | Chlus | ........................ | F01D 5/20 416/1 |
| 2017/0234146 A1* | 8/2017 | Bunker | ................... | F01D 5/147 416/1 |

* cited by examiner

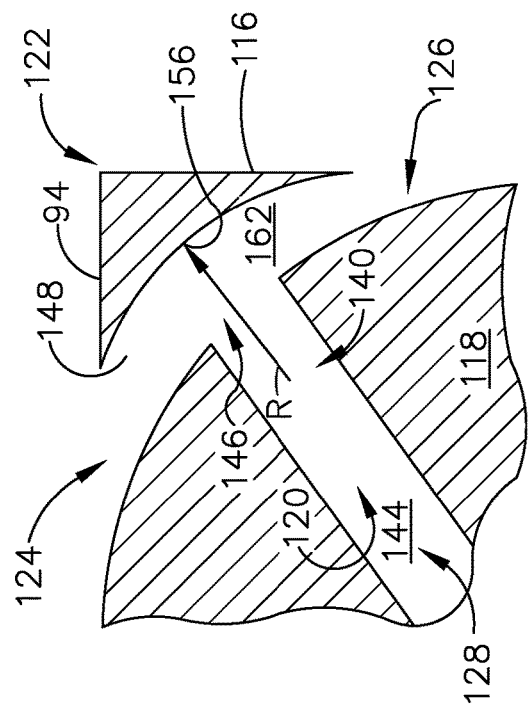
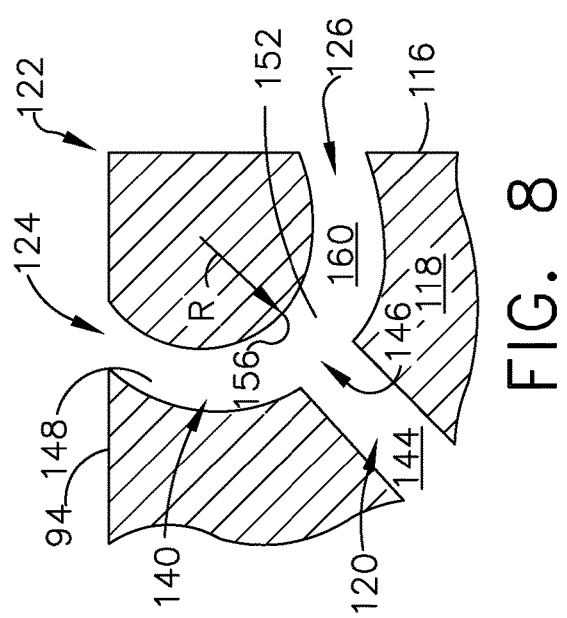
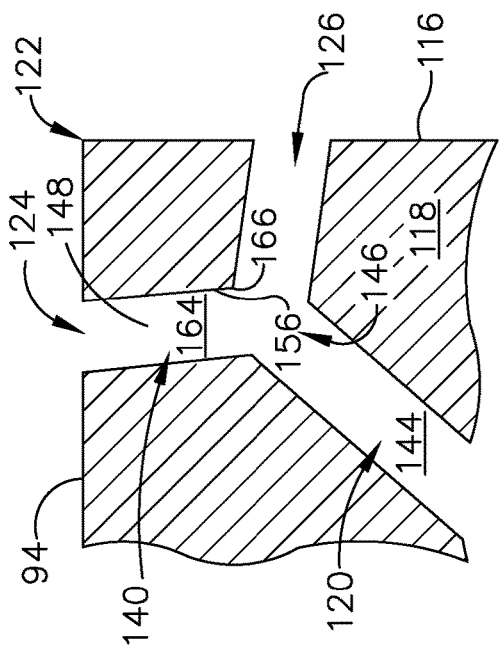

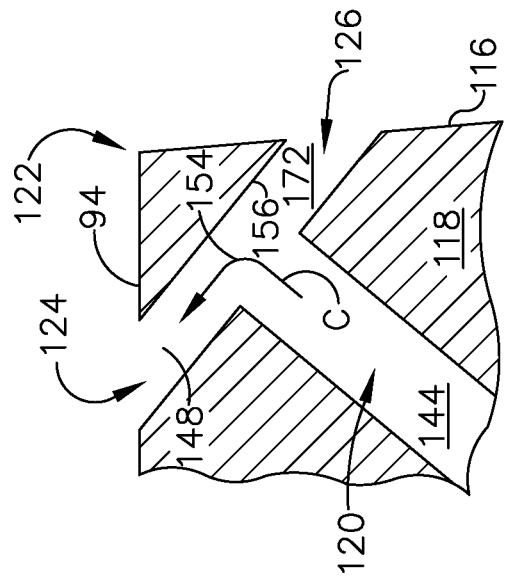
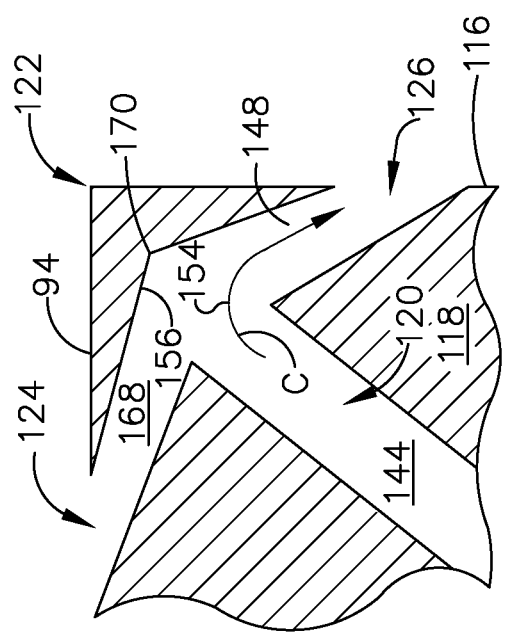

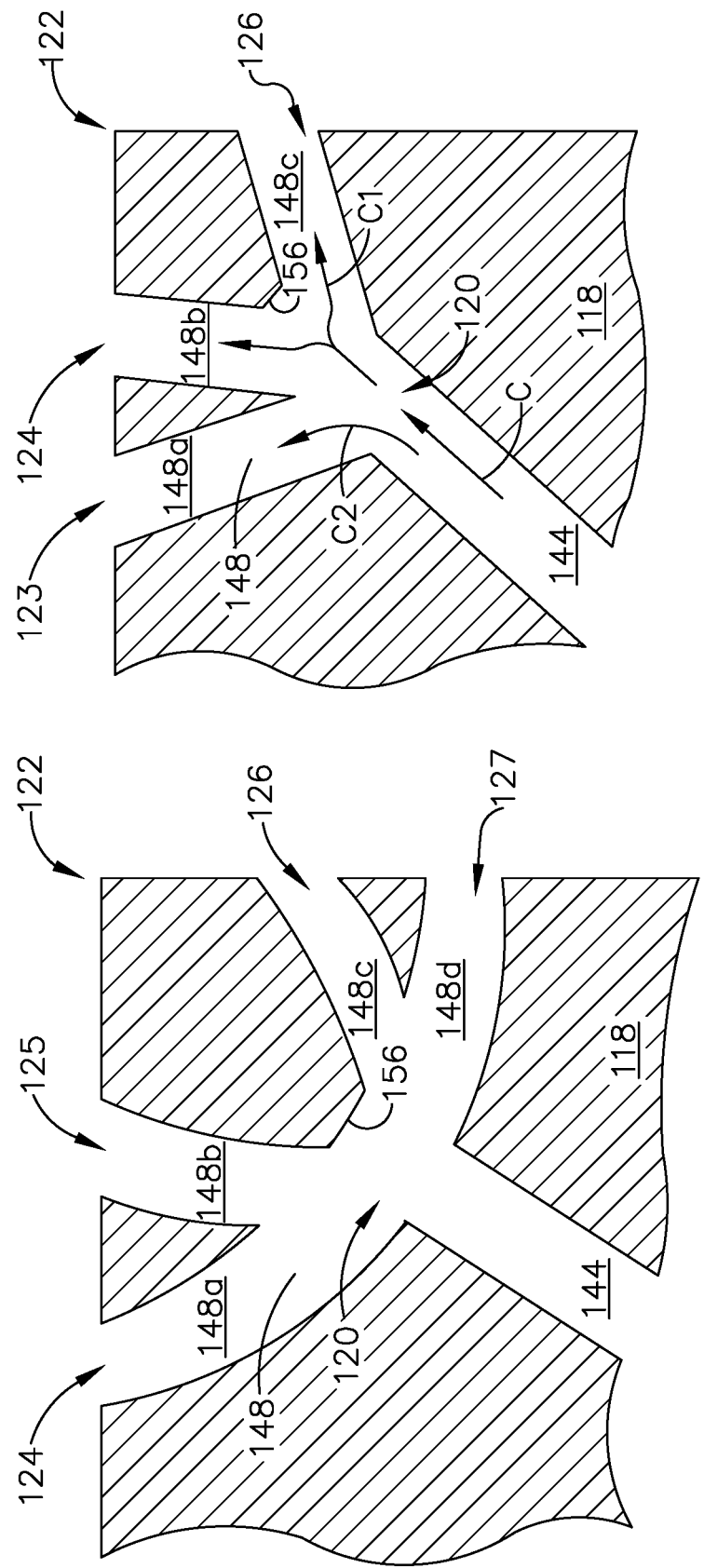

ENGINE COMPONENT WITH COOLING HOLE

BACKGROUND OF THE INVENTION

Turbine engines, and particularly gas or combustion turbine engines, are rotary engines that extract energy from a flow of combusted gases passing through the engine onto a multitude of rotating turbine blades.

Turbine blade assemblies include the turbine airfoil, such as a stationary vane or rotating blade, with the blade having a platform and a dovetail mounting portion. The turbine blade assembly includes cooling inlet passages as part of serpentine circuits in the platform and blade used to cool the platform and blade. The serpentine circuits can extend to cooling holes located along any of the multiple surfaces of the blade including at the tip, trailing edge, and leading edge. Nozzles comprising stationary vanes located between inner and outer bands and combustor liners surrounding the combustor of the engine can also utilize cooling holes and/or serpentine circuits.

BRIEF DESCRIPTION OF THE INVENTION

In one aspect, the present disclosure relates to an airfoil comprising an outer wall bounding an interior and defining a pressure side and a suction side extending between a leading edge and a trailing edge to define a chord-wise direction and extending between a root and a tip to define a span-wise direction, at least one cooling passage within the interior, and at least one cooling hole comprising an inlet in communication with the at least one cooling passage and at least two outlets, a furcated connecting passage having at least one trunk extending from the inlet and branches extending from the at least one trunk to the at least two outlets, with an impingement zone formed between the at least one trunk and the branches.

In another aspect, the present disclosure relates to an engine component comprising an outer wall bounding an interior and defining a pressure side and a suction side extending between a leading edge and a trailing edge to define a chord-wise direction and extending between a root and a tip to define a span-wise direction, at least one cooling passage within the interior, and at least one cooling hole comprising an inlet in communication with the at least one cooling passage and at least two outlets, a furcated connecting passage having at least one trunk extending from the inlet and branches extending from the at least one trunk to the at least two outlets, with an impingement zone formed between the at least one trunk and the branches.

In yet another aspect, the present disclosure relates to a method for cooling an engine component having an outer wall bounding an interior and defining a pressure side and a suction side extending between a leading edge and a trailing edge to define a chord-wise direction and extending between a root and a tip to define a span-wise direction, the method comprising flowing a cooling fluid through a cooling hole fluidly coupled to the interior, impinging the cooling fluid within an impingement zone of the cooling hole to form an impinged airflow, splitting the impinged airflow into multiple branches of the cooling hole, and emitting the impinged airflow through an outlet associated with each of the multiple branches.

BRIEF DESCRIPTION OF THE DRAWINGS

In the drawings:

FIG. 8 is a variation of the geometry of the furcated cooling passage from FIG. 4 according to an aspect of the disclosure herein.

FIG. 9 is another variation of the geometry of the furcated cooling passage from FIG. 4 according to an aspect of the disclosure herein.

FIG. 10 is yet another variation of the geometry of the furcated cooling passage from FIG. 4 according to an aspect of the disclosure herein.

FIG. 11 is another variation of the geometry of the furcated cooling passage from FIG. 4 according to an aspect of the disclosure herein.

FIG. 12 is yet another variation of the geometry of the furcated cooling passage from FIG. 4 according to an aspect of the disclosure herein.

FIG. 13 is a variation of branch locations associated with the furcated cooling passage from FIG. 4 according to an aspect of the disclosure herein.

FIG. 14 is another variation of branch locations associated with the furcated cooling passage from FIG. 4 according to an aspect of the disclosure herein.

DETAILED DESCRIPTION OF THE INVENTION

Figure 1:
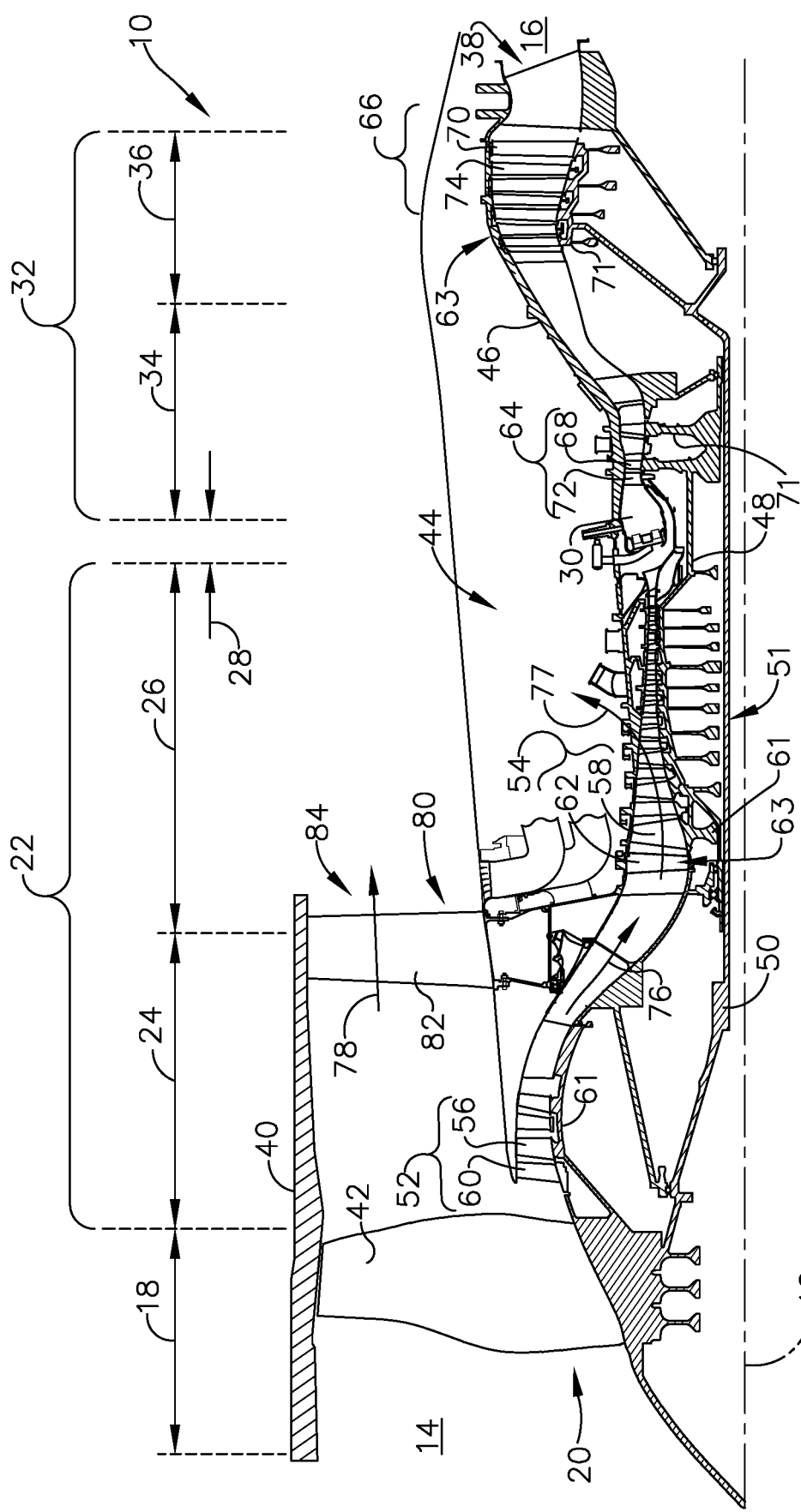
FIG. 1 is a schematic cross-sectional diagram of a turbine engine for an aircraft.

Aspects of the disclosure described herein are directed to the formation of at least one cooling hole having an inlet fluidly coupled to a cooling passage and at least two outlets. In one aspect of the disclosure, one of the outlets is located along a trailing edge and one of the outlets is located along a tip. For purposes of illustration, the present disclosure will be described with respect to a turbine blade and a corner of the blade in the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or engine centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the engine centerline 12 of the engine 10 drivingly connects the HP turbine 34 to the HP compressor 26. A LP shaft or spool 50, which is disposed coaxially about the engine centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine sections 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
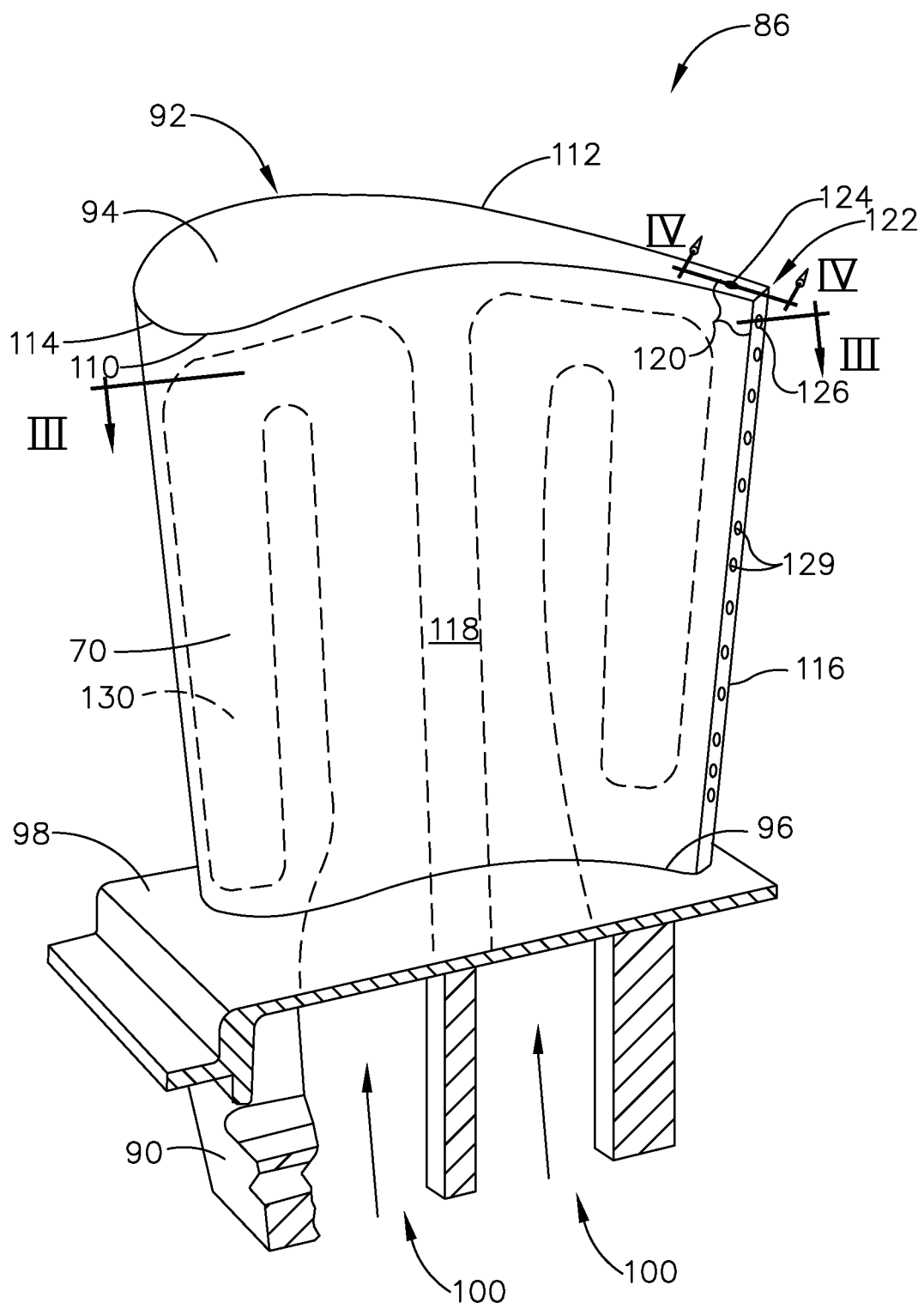
FIG. 2 is a perspective view of a turbine blade for the turbine engine from FIG. 1 including at least one cooling hole located along a leading edge of the turbine blade.

FIG. 2 is a perspective view of an engine component in the form of a turbine blade assembly 86 with a turbine blade 70 of the engine 10 from FIG. 1. Alternatively, the engine component can include a vane, a strut, a service tube, a shroud, or a combustion liner in non-limiting examples, or any other engine component that can require or utilize cooling passages.

The turbine blade assembly 86 includes a dovetail 90 and an airfoil 92. The airfoil 92 extends between a tip 94 and a root 96 to define a span-wise direction. The airfoil 92 mounts to the dovetail 90 on a platform 98 at the root 96. When multiple airfoils are circumferentially arranged in side-by-side relationship, the platforms 98 help to radially contain the turbine engine mainstream air flow. The dovetail 90 can be configured to mount to the turbine rotor disk 71 on the engine 10. The dovetail 90 further includes at least one inlet passage 100, exemplarily shown as two inlet passages 100, each extending through the dovetail 90 to provide internal fluid communication with the airfoil 92. It should be appreciated that the dovetail 90 is shown in cross-section, such that the inlet passages 100 are housed within the body of the dovetail 90.

The airfoil 92 includes a concave-shaped pressure side 110 and a convex-shaped suction side 112 which are joined together to define an airfoil shape of the airfoil 92 extending between a leading edge 114 and a trailing edge 116 to define a chord-wise direction. The airfoil 92 is bound by an outer wall 118 and defined by the pressure and suction sides 110, 112. The interior of the airfoil can be solid, hollow, and/or having multiple cooling circuits or passages 130 illustrated in dashed line. At least one cooling hole 120 can be located at a corner 122 of the airfoil 92 formed where the tip 94 meets the trailing edge 116. The at least one cooling hole 120 includes at least two outlets, a tip outlet 124 located along the tip 94 and a trailing edge outlet 126 located along the trailing edge 116. Other cooling holes 129 can be located at any suitable location of the airfoil 92.

Figure 3:
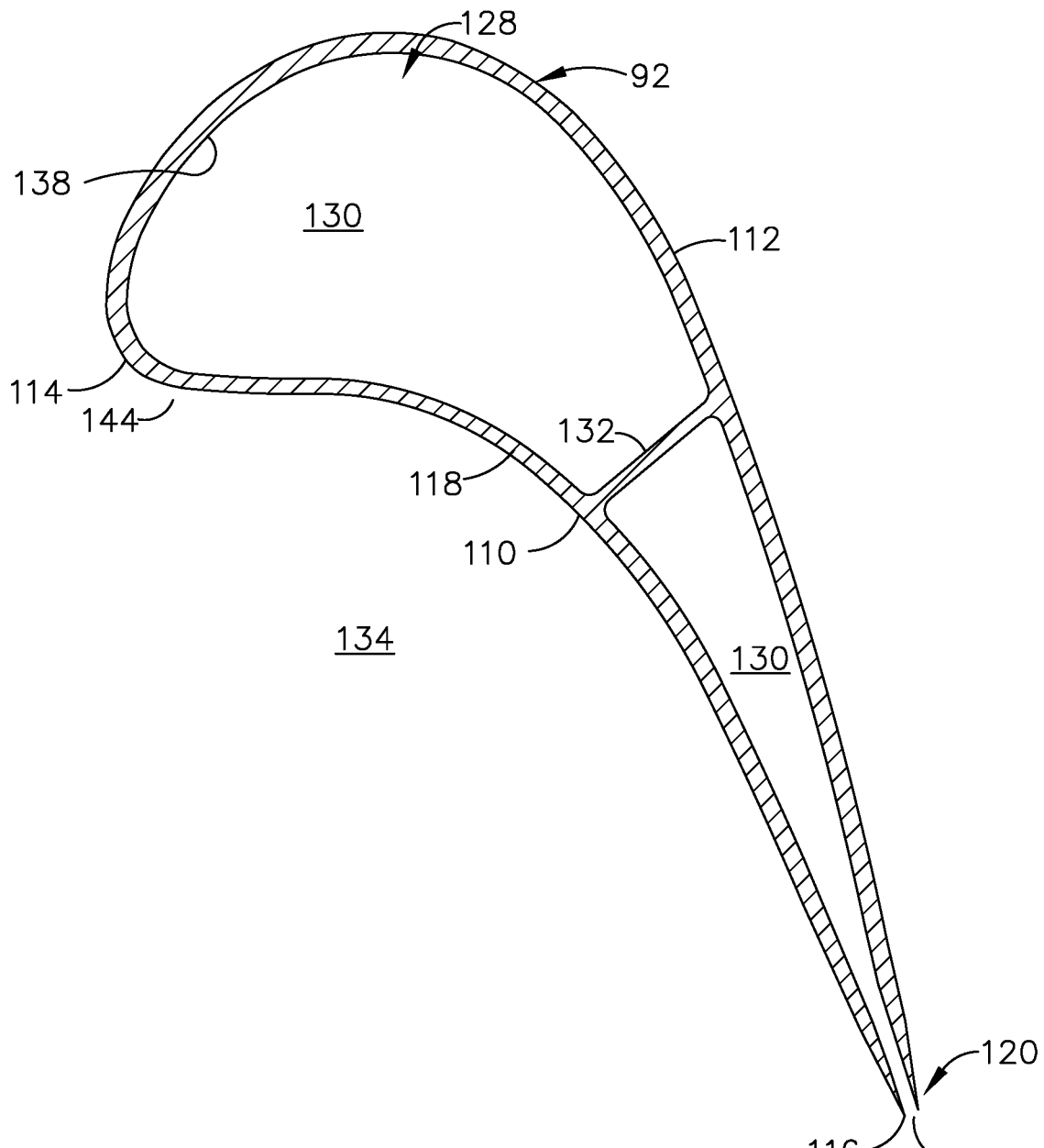
FIG. 3 is a cross-section of the turbine blade from FIG. 2 taken along line III-III.

FIG. 3 is a cross-section taken along line of III-III FIG. 2 showing a portion of the at least one cooling hole 120, specifically a portion including the trailing edge outlet 126 within the outer wall 118. An interior 128 of the airfoil 92 is bound by outer wall 118 and can include multiple cooling passages 130. The multiple cooling passages 130 can be fluidly coupled with at least one of the inlet passages 100. The multiple cooling passages 130 can be separated by an interior wall or walls 132. Interior walls 132 can extend between the pressure and suction sides 110, 112 as illustrated, and in other non-limiting examples can be any wall within the airfoil 92 and defining at least a portion of the multiple cooling passages 130. The at least one cooling hole 120 can fluidly couple the interior 128 of the airfoil 92 to an exterior 134 of the airfoil 92.

The at least one cooling hole 120, and other cooling holes 129, can pass through a substrate, which by way of illustration is outer wall 118. It should be understood, however, that the substrate can be any wall within the engine 10 including but not limited to the interior walls 132, a tip wall, or a combustion liner wall. Materials used to form the substrate include, but are not limited to, steel, refractory metals such as titanium, or superalloys based on nickel, cobalt, or iron, and ceramic matrix composites. The superalloys can include those in equiaxed, directionally solidified, and crystal structures. The substrate can be formed by, in non-limiting examples, 3D printing, investment casting, or stamping.

Figure 4:
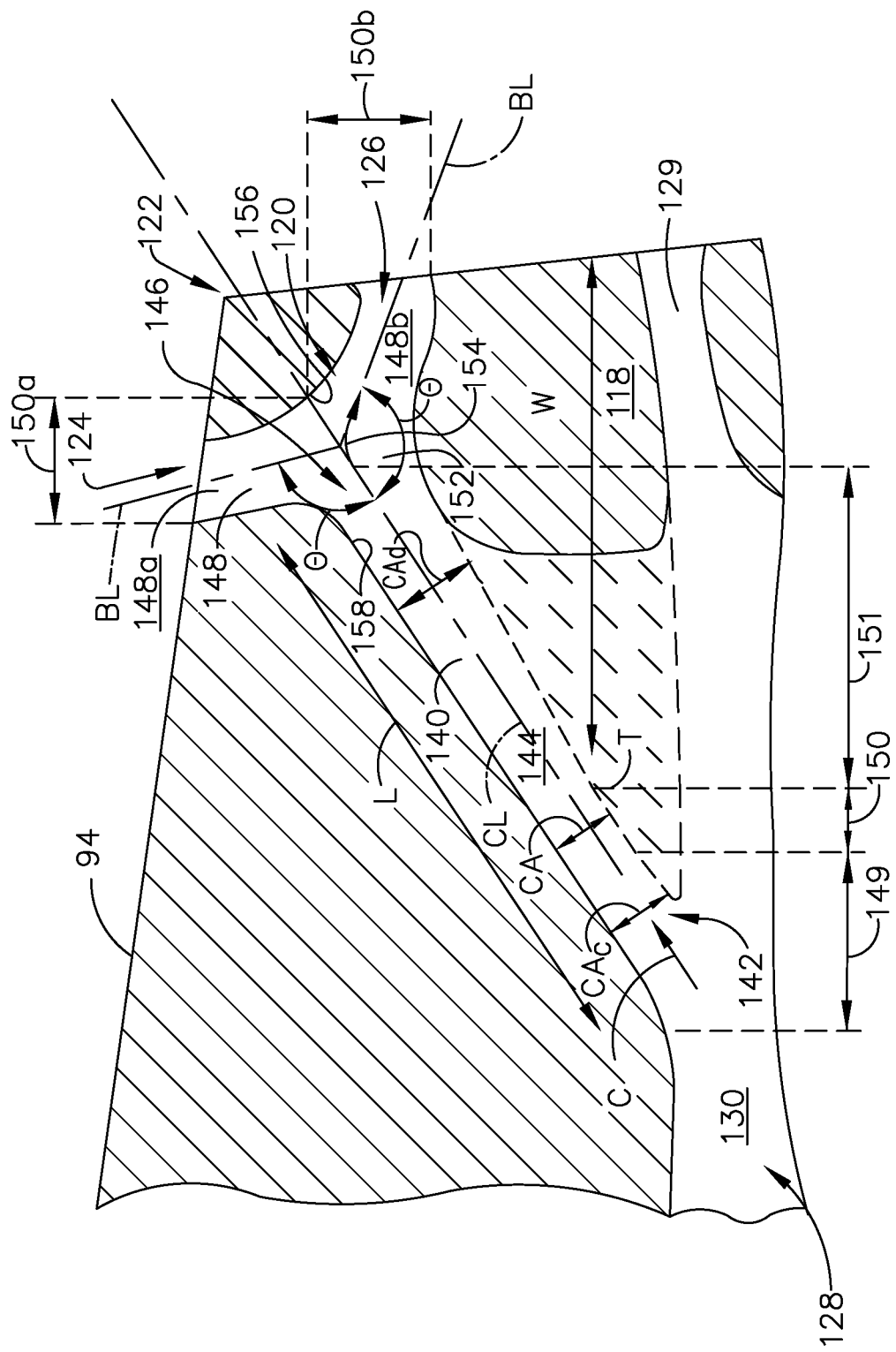
FIG. 4 is a cross-section of a corner of the turbine blade from FIG. 2 illustrating a furcated cooling passage for a cooling hole taken along line IV-IV.

FIG. 4 is a cross-section taken along line IV-IV of FIG. 2 showing the at least one cooling hole 120 at the corner 122 of airfoil 92. It is contemplated that the at least one cooling hole 120 includes a furcated connecting passage 140 extending between an inlet 142 and the at least two outlets 124, 126. The furcated connecting passage includes at least one trunk 144 extending from the inlet 142 and fluidly coupling the cooling passage 130 to an intermediate outlet 146. Multiple branches 148 extend from the at least one trunk 144 to the at least two outlets 124, 126. By way of non-limiting example a first branch 148a extends from the intermediate outlet 146 to the tip outlet 124 and a second branch 148b extends from the intermediate outlet 146 to the trailing edge outlet 126. While illustrated as one trunk, it is contemplated that multiple trunks extend from the inlet and each are fluidly coupled to multiple branches.

At least one converging section 149 can be fluidly coupled to the inlet 142 and define at least a part of the furcated connecting passage 140. The at least one converging section can be provided at or near the inlet. As illustrated, the at least one converging section 149 defines a decreasing cross-sectional area (CAc) of the furcated connecting passage 140. The at least one converging section 149 can extend from the inlet to a first transition location (T1) where the cross-sectional area (CA) becomes constant. In one alternative, non-limiting implementation, the decreasing cross-sectional area (CAc) can be a discontinuous or step-wise decreasing cross-sectional area. It should be appreciated that more than one converging section 149 can be formed in the furcated connecting passage 140. It is also contemplated that the furcated cooling passage 140 has no converging section 149.

In an aspect of the disclosure herein, the at least one converging section 149 can terminate in at least one metering section 150 to define at least part of the furcated connecting passage 140. It is further contemplated the at least one metering section 150 can be provided at or near the inlet 142 upstream of the converging section 149 or in place of the converging section 149. As illustrated, the at least one metering section 150 defines the smallest cross-sectional area (CA) of the furcated connecting passage 140. In one aspect of the disclosure herein, a centerline (CL) intersects the geometric center of the cross-sectional area (CA) and extends along a length (L) of the at least one trunk 144. The at least one metering section 150 can extend from the first transitional location (T1) to a second transition location (T2) where the cross-sectional area (CA) begins to increase. It should be appreciated that more than one metering section 150 can be formed in the furcated connecting passage 140. By way of a non-limiting example, a tip metering section 150a can be formed in the first branch 148a and a trailing edge metering section 150b can be formed in the second branch 148b. As is illustrated in dashed line, the outer wall 118 can have varying widths (W) proximate the furcated connecting passage 140 such that the at least one metering section 150 can vary in length (L). It is further contemplated that the metering section 150 has no length and can define the inlet 142, the transition locations (T1, T2), or the intermediate outlet 146, or any location at which the cross-sectional area (CA) of the furcated connecting passage 140 is the smallest.

A diffusing section 151 can be provided at or near the intermediate outlet 146. Again the variation in width (W) of the outer wall 118 influences the extent at which the cross-sectional area (CA) along the length (L) of the diffusing section 151 changes. The diffusing section 151 can have an increasing cross-sectional area (CAd) extending toward the intermediate outlet 146 from the transition location (T). In one example, the increasing cross-sectional area (CAd) is continuously increasing as illustrated. In one alternative, non-limiting implementation, the increasing cross-sectional area can be a discontinuous or step-wise increasing cross-sectional area. It is also contemplated that the furcated cooling passage 140 has no diffusing section 151.

An impingement zone 152 is formed within the furcated connecting passage 140 between the at least one trunk 144 and the multiple branches 148. An impingement surface 156 is located opposite the intermediate outlet 146. The impingement zone 152 can define a turn 154. The turn 154 can be measured from the centerline (CL) through an angle θ toward at least one branch centerline (BL) extending through a geometric center of the at least two outlets 124, 126 of one of the multiple branches 148. The turn 154 is preferably defined by an angle θ greater than or equal to 40 degrees. It is further contemplated that the angle θ is between 40 and 180 degrees.

Interior surface 158 can have a smooth profile to enhance the flow of any cooling fluid through the furcated connecting passage 140. It is further contemplated that the interior surface 158 could be a rough interior surface having a jagged profile with high roughness for turbulating the flow of any cooling fluid through the furcated connecting passage 140. The interior surface 158 could also have a patterned profile for controlled turbulation of the cooling fluid flow through the furcated connecting passage 140. Utilizing, by way of non-limiting example additive manufacturing, any of the above mentioned surfaces can be contemplated. It is further contemplated that any combination of the profiles for the interior surface 158 as described herein can be implemented in the at least one cooling hole 120 and the other cooling holes 129 as well.

The furcated connecting passage 140 connects the inlet 142 to the at least two outlets 124, 126 through which a cooling fluid (C) can flow. The at least one metering section 150 can meter the mass flow rate of the cooling fluid (C). The diffusing section 151 enables an expansion of the cooling fluid (C) to form a wider and slower flow. The diffusing section 151 can be in serial flow communication with the metering sections 150, 150a, 150b. It is alternatively contemplated that the at least one cooling hole 120 have minimal or no diffusing section 151, or that the metering section 150 extends along the entirety of the at least one trunk 144. The impingement zone 152 enables impingement of the cooling fluid (C) on the impingement surface 156. In one aspect of the disclosure herein the impingement zone 152 can produce cooling fluid (C) with a zero velocity produced by the turn 154. The cooling fluid (C) can exit through the at least two outlets 124, 126 after passing through the impingement zone 152.

Figure 5:
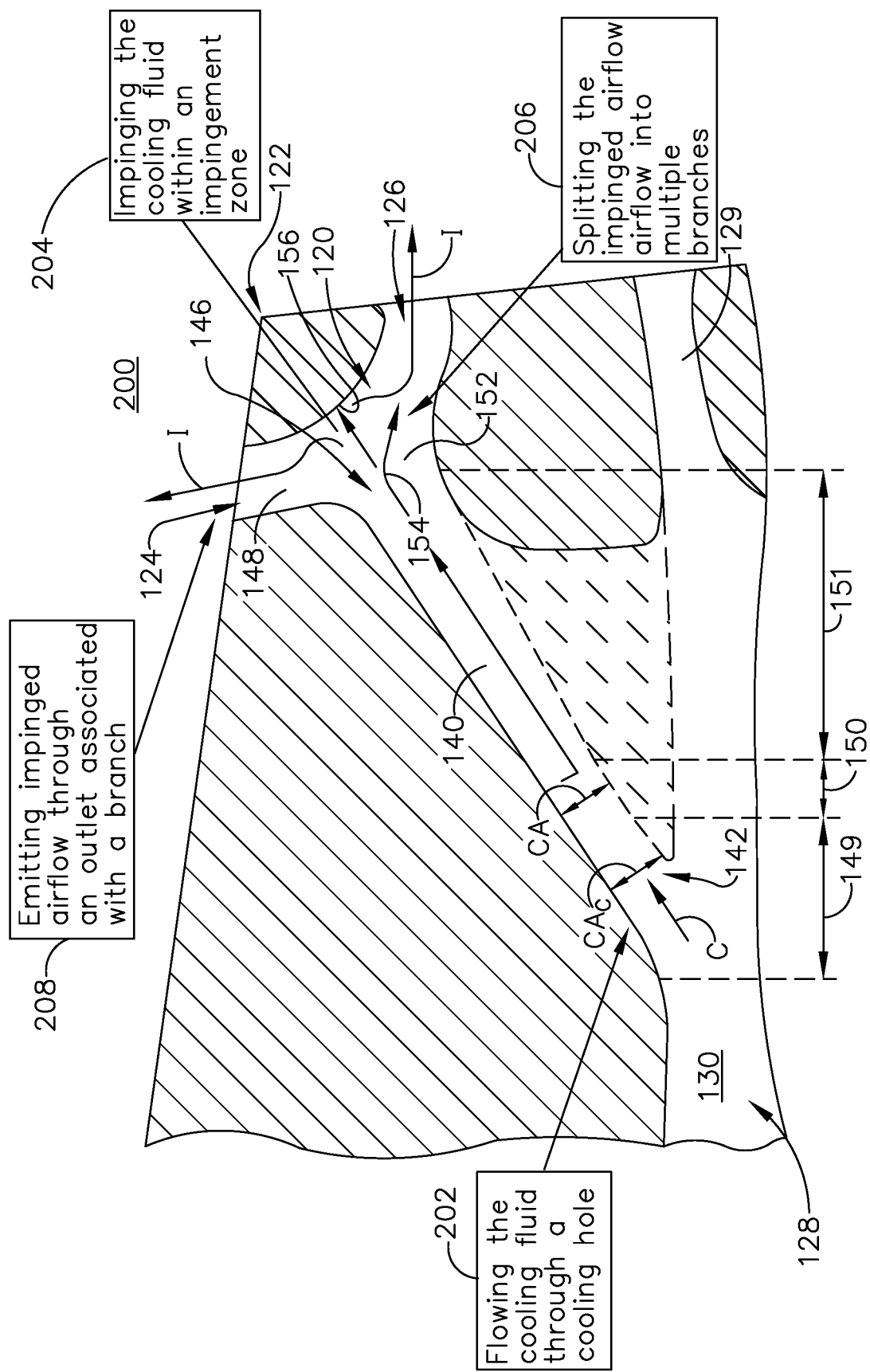
FIG. 5 is the same cross-section of FIG. 4 illustrating a method for cooling a portion of the turbine blade.

A method 200 for cooling an engine component, by way of non-limiting example the airfoil 92 described herein, is illustrated in FIG. 5 which is similar to FIG. 4 with some numbers removed for clarity. The method 200 includes at 202 flowing a cooling fluid (C) through the at least one cooling hole 120 fluidly coupled to the interior 128. At 204 impinging the cooling fluid (C) within an impingement zone 152 on the impingement surface 156 to form an impinged airflow (I). At 206 splitting the impinged airflow (I) into the multiple branches 148 of the at least one cooling hole 120. At 208, emitting the impinged airflow (I) through an outlet 124, 126 associated with each of the multiple branches 148. The method can include emitting the impinged airfoil (I) through the tip outlet 124 and the trailing edge outlet 126. In an aspect of the disclosure herein, the method can also include diffusing the cooling fluid (C) through the diffusing section 151 before impinging the cooling fluid (C) on the impingement surface 156.

Figure 6A:
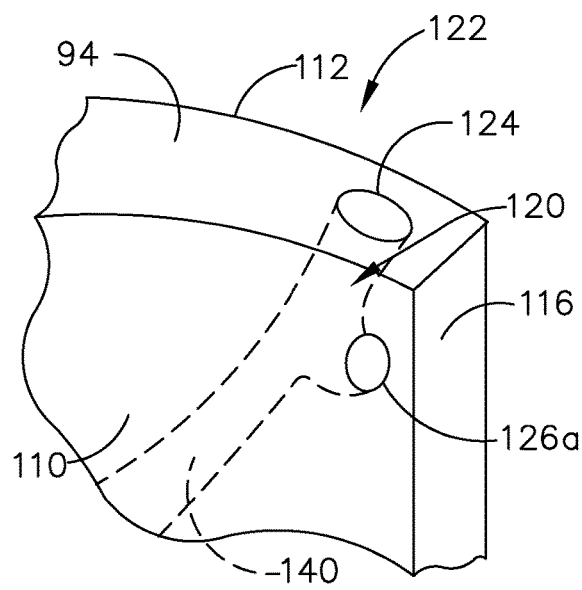
FIG. 6A is a perspective view of one variation for the location of outlets associated with the cooling hole according to an aspect of the disclosure herein.

FIG. 6A illustrates a first variation of the corner 122 with a tip outlet 124 as described herein and a trailing edge outlet 126a located proximate the trailing edge 116 where at least a portion of the trailing edge outlet 126a is located along the pressure side 110 of the airfoil 92.

Figure 6B:
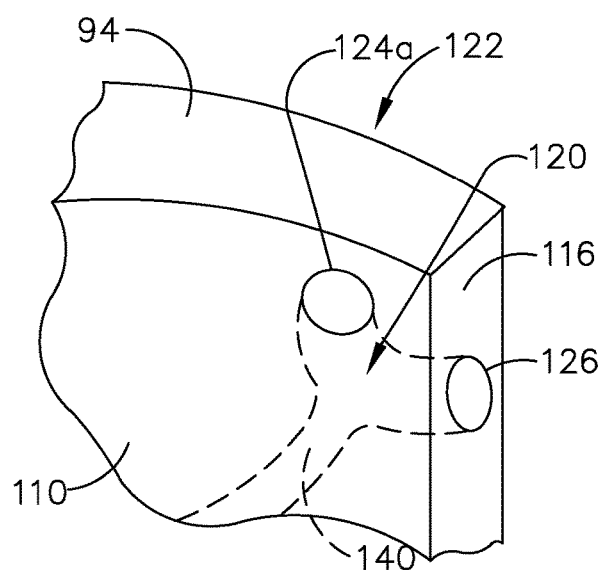
FIG. 6B is a perspective view of another variation for the location of outlets associated with the cooling hole according to an aspect of the disclosure herein.

FIG. 6B shows a second variation of the corner 122 with a tip outlet 124 as described herein and a trailing edge outlet 126b located proximate the trailing edge 116 where at least a portion of the trailing edge outlet 126b is located along the suction side 112 of the airfoil 92. In an aspect of the disclosure herein, the method can include emitting the impinged airflow through a trailing edge outlet 126 located along one of the pressure or suction sides 110, 112.

Figure 6C:
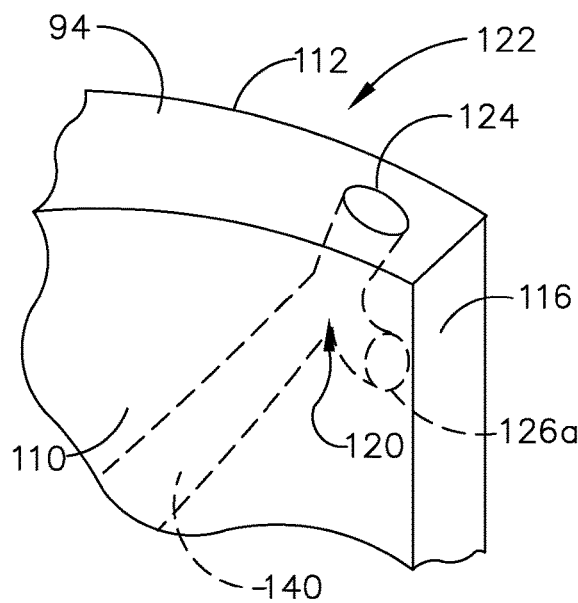
FIG. 6C is a perspective view of another variation for the location of outlets associated with the cooling hole according to an aspect of the disclosure herein.

In FIG. 6C a third variation of the corner 122 is illustrated with a trailing edge outlet 126 as described herein and a tip outlet 124a located proximate the trailing edge 116 where at least a portion of the tip outlet 124a is located along the pressure side 110 of the airfoil 92.

Figure 6D:
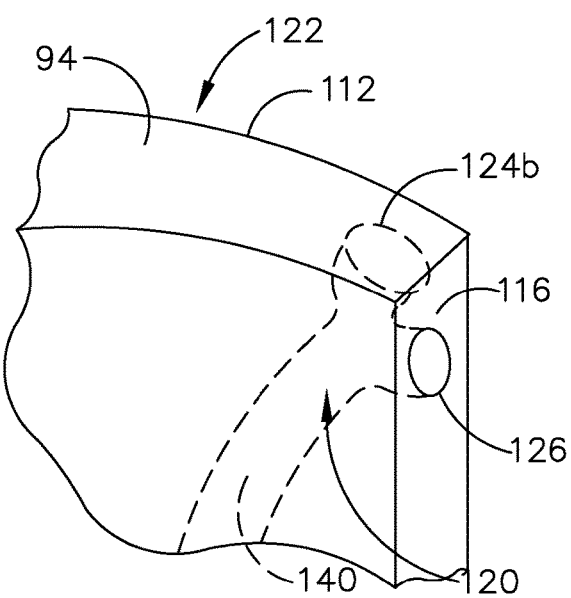
FIG. 6D is a perspective view of yet another variation for the location of outlets associated with the cooling hole according to an aspect of the disclosure herein.

In FIG. 6D a fourth variation of the corner 122 is shown with a trailing edge outlet 126 as described herein and a tip outlet 124b located proximate the trailing edge 116 where at least a portion of the tip outlet 124b is located along the suction side 112 of the airfoil 92. In an aspect of the disclosure herein, the method can include emitting the impinged airflow through a tip outlet 124 located along one of the pressure or suction sides 110, 112.

Figure 7:
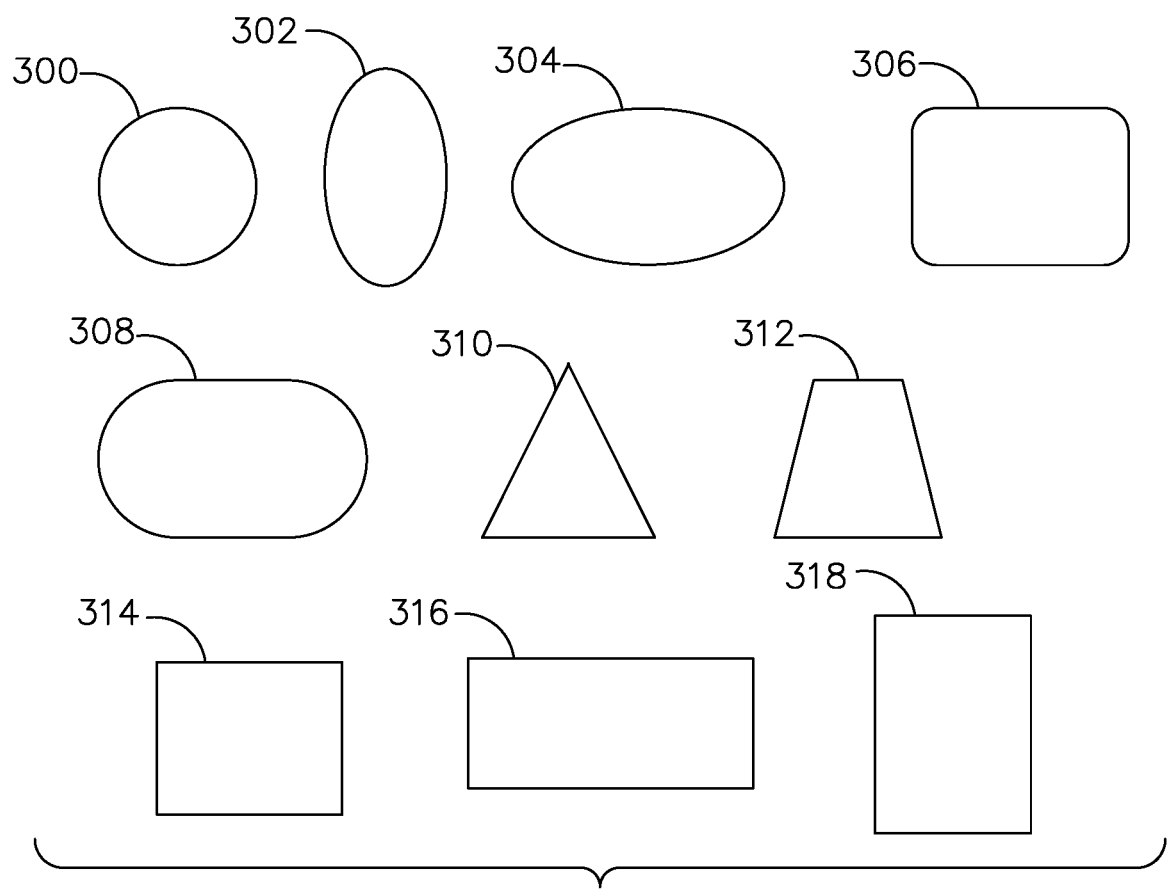
FIG. 7 is ten variations for a cross-sectional area shape of the cooling hole according to aspects of the disclosure herein.

Turning to FIG. 7, variations of the cross-sectional area (CA) for the at least one trunk 144 and multiple branches 148 of the furcated connecting passage 140 are illustrated. It is contemplated that the cross-sectional area (CA) can have a circular 300, vertical elliptical 302, horizontal elliptical 304, rounded rectangular 306, or super elliptical 308 shape. A polygonal shape, by way of non-limiting example triangular 310, trapezoidal 312, square 314, horizontal rectangular 316, or vertical rectangular 318 shape is also contemplated. It should be understood that the cross-sectional area (CA) along any portion of the furcated connecting passage 140 can have any of the shapes described herein, including multiple shapes. By way of non-limiting example the at least one trunk 144 can have a circular 300 cross-sectional area, the first branch 148a extending to the tip outlet 124 can have a horizontal elliptical 304 shaped cross-sectional area, and the second branch 148b extending to the trailing edge outlet 126 can have a vertical elliptical 302 shaped cross-sectional area. It is further contemplated that any one of the parts of the furcated connecting passage 140 can have multiple cross-sectional area shapes, by way of non-limiting example the at least one trunk 144 can have a triangular 310 cross-sectional area at one location along length (L) while having a trapezoidal cross-sectional area 312 at another location along the length (L).

Turning to FIG. 8, a first variation of the orientation of the multiple branches 148 with respect to the at least one trunk 144 of the furcated cooling passage 140 is contemplated. It should be noted that some numbers have been removed for clarity. The multiple branches 148 can form a substantially concave passage 160 having a radius (R) with respect to the corner 122 of the airfoil 92.

In another variation of the orientation of the multiple branches 148 illustrated in FIG. 9, the multiple branches 148 can form a substantially convex passage 162 having a radius (R) with respect to the interior 128 of the airfoil 92. It is contemplated that the branches 148 can be formed with multiple radii and be any combination of the passages 160, 162 described herein. By way of non-limiting example the multiple branches 148 can include at least one branch with a substantially concave passage 160 and at least one branch with a substantially convex passage 162.

In yet another variation of the orientation of the multiple branches 148 illustrated in FIG. 10, the multiple branches can form a V-shaped passage 164 such that the impingement surface 156 includes an apex 166 of the V-shaped passage 164. The apex 166 can point towards the intermediate outlet 146.

An inverted variation of FIG. 10 is illustrated in FIG. 11. The multiple branches 148 can form a V-shaped passage 168 wherein the cooling fluid (C) turns further away from the corner 122 with respect to the variation illustrated in FIG. 10. In other words an apex 170 of the V-shaped passage 168 points away from the intermediate outlet 146.

It is also contemplated that the multiple branches 148 form a substantially straight passage 172 such that the branches 148 and at least one trunk 144 together form a T-shape cooling passage as illustrated in FIG. 12. In this variation the impingement surface 156 is substantially flat and the turn 154 made by the cooling fluid (C) as described herein is close to 90 degrees.

Turning to FIG. 13, it is also contemplated that the multiple branches 148 are more than two branches, and can be four branches 148*a*, 148*b*, 148*c*, 148*d* as illustrated. It is contemplated that two tip outlets 124, 125 and two trailing edge outlets 126, 127 in fluid communication with the at least one trunk 144 via the four branches 148*a*, 148*b*, 148*c*, 148*d* respectively are formed. While illustrated as four branches and four outlets, it should be understood that multiple combinations of the variations described herein are contemplated and that those shown are for illustrative purposes only and not meant to be limiting.

FIG. 14 illustrates a furcated connecting passage where only a portion (C1) of the cooling fluid (C) is impinged on the impingement surface 156 before exiting the branches 148 and another portion (C2) turns from the at least one trunk 144 directly into a branch 148*a* is emitted through an outlet 123 that can be located along the tip 94 as illustrated. It is further contemplated that the outlet 123 is located along any of the pressure side 110, suction side 112, or trailing edge 116 as previously described herein.

Though illustrated in some figures as rounded corners and some as pointed corners, it should be understood that transition locations between the at least one trunk 144 and the multiple branches 148 including the corners and impingement surface 156 can be pointed, rounded corners, or have varying radii depending on the impingement required for the airfoil corner 122 manufactured. All such geometries are contemplated. It should be understood that any combination of the geometry of the furcated connecting passage 140 of the at least one cooling hole 120 as described herein is contemplated. The varying aspects of the disclosure discussed herein are for illustrative purposes and not meant to be limiting.

Blade tip and tip corners are susceptible to oxidation due to difficulty in applying cooling locally. Edge regions of high pressure turbine blades are especially difficult to cool. The at least one cooling hole as described herein enables cooling of this region. The at least one cooling hole as described herein provides local enhanced cooling performance for a difficult region to cool by utilizing convection cooling. By impinging a cooling fluid on the impingement surface as described herein, the corner becomes cooled.

Benefits associated with cooling this region in particular decrease a tendency to oxidize and can therefore improve performance and component life. The surface area of the airfoil extracts work from the flow path to turn the rotor. Oxidation is a chemical reaction that results in material loss, and therefore area loss, and decreased efficiency of the turbine blade. By more effectively cooling this region, oxidation is reduced, thus maintaining turbine efficiency. Other benefits include reducing service costs and better specific fuel consumption due to an increased in a hot gas path durability.

The at least one cooling hole as described herein can be manufactured utilizing additive manufacturing technologies or other advanced casing manufacturing technologies such as investment casting and 3-D printing. The technologies available provide cost benefits along with the other benefits described. It should be understood that other methods of forming the cooling circuits and cooling holes described herein are also contemplated and that the methods disclosed are for exemplary purposes only.

It should be appreciated that application of the disclosed design is not limited to turbine engines with fan and booster sections, but is applicable to turbojets and turbo engines as well.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil comprising:
    an outer wall bounding an interior and defining a pressure side and a suction side extending between a leading edge and a trailing edge to define a chord-wise direction and extending between a root and a tip to define a span-wise direction;
    at least one cooling passage within the interior;
    a corner formed where the tip meets the trailing edge; and
    at least one cooling hole located at the corner and comprising an inlet in communication with the at least one cooling passage and at least two outlets, a furcated connecting passage having at least one trunk extending from the inlet and branches extending from the at least one trunk to the at least two outlets, with an impingement zone formed between the at least one trunk and the branches.

2. The airfoil of claim 1 wherein the at least two outlets are a tip outlet located along the tip and a trailing edge outlet located along the trailing edge.

3. The airfoil of claim 2 wherein the branches form a substantially convex passage between the trailing edge outlet and the tip outlet with respect to the corner.

4. The airfoil of claim 2 wherein the branches form a substantially concave passage between the trailing edge outlet and the tip outlet with respect to the corner.

5. The airfoil of claim 2 wherein the branches form a V-shaped passage between the trailing edge outlet and the tip outlet.

6. The airfoil of claim 2 wherein the branches and at least one trunk together form a T-shape.

7. The airfoil of claim 1 wherein the at least one trunk extends from the inlet to an intermediate outlet located within the furcated connecting passage.

8. The airfoil of claim 7 wherein the impingement zone further comprises an impingement surface located opposite of the intermediate outlet.

9. The airfoil of claim 1 wherein the furcated connecting passage further comprises a cross-sectional area having at least one of a circular, elliptical, rounded rectangular, super elliptical, polygonal, triangular, trapezoidal, square, or rectangular shape.

10. The airfoil of claim 1 further comprising a metering section.

11. The airfoil of claim 1 further comprising a diffusing section.

12. An engine component comprising:
an outer wall bounding an interior and defining a pressure side and a suction side extending between a leading edge and a trailing edge to define a chord-wise direction and extending between a root and a tip to define a span-wise direction;
at least one cooling passage within the interior;
a corner formed where the tip meets the trailing edge; and
at least one cooling hole located at the corner and comprising an inlet in communication with the at least one cooling passage and at least two outlets, a furcated connecting passage having at least one trunk extending from the inlet and branches extending from the at least one trunk to the at least two outlets, with an impingement zone formed between the at least one trunk and the branches.

13. The engine component of claim 12 wherein the branches form a substantially convex passage between the at least two outlets with respect to the interior.

14. The engine component of claim 12 wherein the branches form a substantially concave passage between the at least two outlets with respect to the interior.

15. The engine component of claim 12 wherein the branches form a V-shaped passage between the at least two outlets.

16. The engine component of claim 12 wherein the branches and at least one trunk together form a T-shape.

17. The engine component of claim 12 wherein the at least one trunk extends from the inlet to an intermediate outlet located within the furcated connecting passage and an impingement surface is located opposite of the intermediate outlet.

18. The engine component of claim 12 wherein the furcated connecting passage further comprises a cross-sectional area having at least one of a circular, elliptical, rounded rectangular, super elliptical, triangular, trapezoidal, square, or rectangular shape.

19. The engine component of claim 12 further comprising a metering section.

20. The engine component of claim 12 further comprising a diffusing section.

21. A method for cooling an engine component having an outer wall bounding an interior and defining a pressure side and a suction side extending between a leading edge and a trailing edge to define a chord-wise direction and extending between a root and a tip to define a span-wise direction, the method comprising:
flowing a cooling fluid through a cooling hole fluidly coupled to the interior;
impinging the cooling fluid within an impingement zone of the cooling hole to form an impinged airflow;
splitting the impinged airflow into multiple branches of the cooling hole;
emitting the impinged airflow through an outlet associated with each of the multiple branches; and
emitting the impinged airflow through a tip outlet located along the tip and a trailing edge outlet located along the trailing edge.

22. The method of claim 21 further comprising emitting the impinged airflow along one of the pressure or suction sides.

23. The method of claim 21 further comprising diffusing the cooling fluid through a diffusing section.

* * * * *